(12) United States Patent
Carrasco (10) Patent No.: US 7,864,762 B2
(45) Date of Patent: Jan. 4, 2011

(54) ETHERNET ENCRYPTION OVER RESILIENT VIRTUAL PRIVATE LAN SERVICES

(75) Inventor: Serge-Paul Carrasco, Menlo Park, CA (US)

(73) Assignee: CipherOptics, Inc., Raleigh, NC (US)

( * ) Notice: Subject to any disclaimer, the term of this patent is extended or adjusted under 35 U.S.C. 154(b) by 385 days.

(21) Appl. No.: 11/706,442

(22) Filed: Feb. 14, 2007

(65) Prior Publication Data

US 2008/0192739 A1    Aug. 14, 2008

(51) Int. Cl.
H04L 12/28    (2006.01)
H04L 12/56    (2006.01)

(52) U.S. Cl. .................................. 370/389; 726/15

(58) Field of Classification Search .................. None
See application file for complete search history.

(56) References Cited

U.S. PATENT DOCUMENTS

| | | | |
|---|---|---|---|
| 4,200,770 A | 4/1980 | Hellman et al. | |
| 5,237,611 A | 8/1993 | Rasmussen et al. | |
| 5,577,209 A | 11/1996 | Boyle et al. | |
| 5,812,671 A | 9/1998 | Ross, Jr. | |
| 5,835,726 A | 11/1998 | Shwed et al. | |
| 5,870,475 A | 2/1999 | Allan et al. | |
| 5,940,591 A | 8/1999 | Boyle et al. | |
| 6,035,405 A | 3/2000 | Gage et al. | |
| 6,061,600 A | 5/2000 | Ying | |
| 6,173,399 B1 | 1/2001 | Gilbrech | |
| 6,185,680 B1 | 2/2001 | Shimbo et al. | |
| 6,275,859 B1 | 8/2001 | Wesley et al. | |
| 6,330,562 B1 | 12/2001 | Boden et al. | |
| 6,351,536 B1 | 2/2002 | Sasaki | |
| 6,484,257 B1 | 11/2002 | Ellis | |
| 6,539,483 B1 | 3/2003 | Harrison et al. | |
| 6,556,547 B1 | 4/2003 | Srikanth et al. | |
| 6,591,150 B1 | 7/2003 | Shirota | |
| 6,658,114 B1 | 12/2003 | Farn et al. | |
| 6,697,857 B1 | 2/2004 | Dixon et al. | |
| 6,708,273 B1 | 3/2004 | Ober et al. | |
| 6,711,679 B1 | 3/2004 | Guski et al. | |
| 6,823,462 B1 | 11/2004 | Cheng et al. | |

(Continued)

OTHER PUBLICATIONS

Frankel, S. "Demystifying the IPsec Puzzle," *Artech House*, Ch. 5, pp. 87-127 (2001).

(Continued)

*Primary Examiner*—Chirag G Shah
*Assistant Examiner*—Minh-Trang Nguyen
(74) *Attorney, Agent, or Firm*—Hamilton, Brook, Smith & Reynolds, P.C.

(57) ABSTRACT

Encryption of Ethernet/IEEE 802.3 packet data units (PDUs) at the edge of the enterprise network, in such a way as to support resilient Virtual Private LAN Services (VPLS) network designs. The Ethernet traffic is securely tunneled within encrypted Ethernet tunnels from the edge to the edge of the enterprise network. The encrypted Ethernet traffic is also tunneled within Multi-Protocol Layer Switching (MPLS) tunnels from the edge to the edge of the service provider network. The enterprise network thus manages its own Ethernet site-to-site Virtual Private Network (VPN). The service provider thus independently manages its own MPLS network. The result provides a VPLS or Layer 2 MPLS VPN to the enterprise; the enterprise Ethernet encrypted network can thus be considered as an overlay to the MPLS service provider network.

20 Claims, 7 Drawing Sheets

U.S. PATENT DOCUMENTS

| | | | |
|---|---|---|---|
| 6,915,437 B2 | 7/2005 | Swander et al. | |
| 6,920,559 B1 | 7/2005 | Nessett et al. | |
| 6,981,139 B2 | 12/2005 | Enokida | |
| 6,986,061 B1 | 1/2006 | Kunzinger | |
| 7,082,198 B1 * | 7/2006 | Ishii | 380/239 |
| 7,103,784 B1 | 9/2006 | Brown et al. | |
| 7,106,756 B1 | 9/2006 | Donovan et al. | |
| 7,373,660 B1 * | 5/2008 | Guichard et al. | 726/15 |
| 2002/0069356 A1 | 6/2002 | Kim | |
| 2002/0154782 A1 | 10/2002 | Chow et al. | |
| 2002/0162026 A1 | 10/2002 | Neuman et al. | |
| 2003/0012205 A1 | 1/2003 | Foti et al. | |
| 2003/0135753 A1 | 7/2003 | Batra | |
| 2003/0177396 A1 | 9/2003 | Bartlett et al. | |
| 2003/0182431 A1 | 9/2003 | Sturniolo et al. | |
| 2003/0191937 A1 | 10/2003 | Balissat et al. | |
| 2003/0200456 A1 | 10/2003 | Cyr et al. | |
| 2003/0233576 A1 | 12/2003 | Maufer et al. | |
| 2004/0005061 A1 | 1/2004 | Buer et al. | |
| 2004/0044891 A1 | 3/2004 | Hanzlik et al. | |
| 2004/0062399 A1 | 4/2004 | Takase | |
| 2004/0160903 A1 | 8/2004 | Gai et al. | |
| 2004/0205342 A1 | 10/2004 | Roegner | |
| 2004/0268124 A1 | 12/2004 | Narayanan | |
| 2005/0010765 A1 | 1/2005 | Swander et al. | |
| 2005/0066159 A1 | 3/2005 | Poussa et al. | |
| 2005/0083947 A1 | 4/2005 | Vaarala et al. | |
| 2005/0102514 A1 | 5/2005 | Bergenwall et al. | |
| 2005/0125684 A1 | 6/2005 | Schmidt | |
| 2005/0138353 A1 | 6/2005 | Spies et al. | |
| 2005/0138369 A1 | 6/2005 | Lebovitz et al. | |
| 2005/0144439 A1 | 6/2005 | Park et al. | |
| 2005/0149732 A1 | 7/2005 | Freeman et al. | |
| 2005/0160161 A1 | 7/2005 | Barrett et al. | |
| 2005/0190758 A1 | 9/2005 | Gai et al. | |
| 2005/0232277 A1 | 10/2005 | See | |
| 2006/0002423 A1 | 1/2006 | Rembert et al. | |
| 2006/0010324 A1 | 1/2006 | Appenzeller et al. | |
| 2006/0072748 A1 | 4/2006 | Buer | |
| 2006/0072762 A1 | 4/2006 | Buer | |
| 2006/0136437 A1 | 6/2006 | Yamasaki | |
| 2006/0177061 A1 | 8/2006 | Orsini et al. | |
| 2006/0198368 A1 | 9/2006 | Guichard et al. | |
| 2007/0076709 A1 * | 4/2007 | Mattson et al. | 370/389 |
| 2007/0186281 A1 * | 8/2007 | McAlister | 726/14 |
| 2008/0040775 A1 | 2/2008 | Hoff et al. | |
| 2008/0083011 A1 | 4/2008 | McAlister et al. | |
| 2008/0127327 A1 | 5/2008 | Carrasco | |

OTHER PUBLICATIONS

Frankel, S. "Demystifying the IPsec Puzzle," *Artech House*, Ch. 9, pp. 179-205 (2001).

Office Action from U.S. Appl. No. 11/656,077 dated Mar. 16, 2010.

* cited by examiner

| Original Ethernet Header (14-18 bytes) | EESP Header (24 bytes) | Encrypted Ethernet Payload (48-1500 bytes) | EESP Pad (0-15 bytes) | EESP Pad Length (1 byte) | EESP Authentication Trailer (12 bytes) | CRC32 |

ETHERNET ENCRYPTION OVER RESILIENT VIRTUAL PRIVATE LAN SERVICES

BACKGROUND OF THE INVENTION

1. Field of the Invention

The present invention relates generally to enterprise networks, and, more particularly, to encryption over enterprise networks.

2. Description of the Prior Art

The present invention relates to how enterprise networks can secure their Ethernet packet data units (PDUs) using Ethernet encryption when that Ethernet traffic is transported over resilient Multi-Protocol Layer Switching (MPLS) Layer 2 Virtual Private Networks (VPNs), also called Virtual Private Line Services (VPLS).

Enterprise networks have been connecting their sites distributed over a metro area network (MAN) provided to them by their service providers and using VPLS as defined through a number of Internet drafts and Request For Comments (RFCs) in the IETF Layer 2 VPN working group. Enterprise networks have been using those provider provisioned MPLS networks with different network resiliency scenarios, where Customer Edge (CE) routers can be redundant and/or service Providers Edge (PE) routers can also be redundant.

PROBLEMS WITH THE PRIOR ART

Virtual Private LAN Services or Layer 2 MPLS VPNs

Service providers have been supplying VPLS VPNs to their commercial enterprise customers using their MPLS metro networks. Enterprise networks are connected to their service provider networks through their edge routers called Customer Edge (CE) routers. Service providers offer the MPLS VPN through their Provider Edge (PE) routers.

VPLS are presently defined through multiple Internet drafts and RFCs in the Layer 2 VPN working group of the IETF (L2VPN).

VPLS provides connectivity between geographically dispersed enterprise sites across an MPLS metro network, as if they were connected using a LAN. VPLS can be seen as if the MPLS metro network operates as a switch or a bridge.

VPLS emulates the various LANs services over an MPLS transport network and creates a Layer 2 broadcast domain basically through a dynamic Ethernet learning bridge model.

Ethernet frames are carried over a pseudo-wire (PW) which provides an MPLS point-to-point Layer 2 tunnel between two service providers' PEs. PW uses the encapsulation mechanism defined in the RFC 4448 to emulate the Ethernet service. The encapsulation provides two label layers: one for the emulated Ethernet service, and another one for the MPLS underlying tunnel.

Broadcast and multicast are two important LANs services used for Ethernet corporate networks but are not supported by MPLS. VPLS extends the encapsulation defined in RFC 4448 for transporting Ethernet and VLANs traffic across multiple sites that belong to the same enterprise by providing in particular broadcast and multicast capabilities. This requires MAC address learning and aging on a per LSP basis, packet replication across LSPs for multicast and broadcast traffic and for flooding of unknown unicast destination traffic.

Two network protocols are presently used by service providers to provide VPLS services and presently investigated by the IETF: the Label Distribution Protocol (LDP) or the Border Gateway Protocol (BGP).

Deploying Resilient VPLS Networks

Being a critical infrastructure between remote sites, a VPLS network must be designed to ensure resilient network operations. Resiliency at the Layer 2 is provided through redundant paths which deployments ensure protection of the Ethernet traffic and restoration of the VPLS service.

In order to ensure resilient network operations, enterprise customers can multi-home their site traffic over two CEs to the service provider network. Similarly, in order to ensure resilient network operations, service providers can route the enterprise traffic over two PEs located into the same point of presence (POP) or across multiple POPs.

Additionally, enterprise customers can choose to use the services of two or more service providers, therefore ensuring that their CEs communicate to different PEs belonging to different service provider networks.

Encrypting the Ethernet Traffic

The IEEE is presently defining a standard IEEE 802.1 AE Media Access Control Security (MACSec) for encrypting Ethernet frames. However, the present scope of the standard is limited to "hop-by-hop" security, and not "end-to-end" as it is the case for IP Security (IPSec) for securing IP traffic, as defined in the RFC 2401. IPSec encrypts IP application data from end-to-end at Layer 3. For key management, 802.1 AE requires a new standard still in development IEEE 802.1 af Media Access Control (MAC) Key Security.

Following is a working alternative to IEEE 802.1 AE and 802.1 af for Ethernet encryption that we are calling Ethernet Encapsulation Security Payload (EESP), which enables Ethernet encryption from end-to-end between two remote CEs belonging to the same enterprise network. Key management is based on the Internet Key Exchange (IKE) protocol, as defined in the RFC 2409 as it is the case for IPSec.

EESP provides data origin authentication and data integrity for the entire Ethernet packet for both the header and the payload. EESP also provides confidentiality for the Ethernet payload.

Encryption is performed using the Advanced Encryption Standard (AES)-256 Cipher Block Chaining (CBC) algorithm while authentication is provided using the Secure Hash Algorithm (SHA)-1 algorithm. Encryption keys can be negotiated using IKE, or entered manually.

Manual keys are generally not used because of the configuration challenges and re-key requirements to implement them in large networks. For those reasons, IKE is normally used for key exchange. However, IKE is based on a secure connection only established between two policy enforcement points (PEPs), and a resulting key negotiation being completed between those two PEPs. As a result, the connection-oriented nature of IKE has a few drawbacks.

If the traffic needs to be sent and/or received through multiple paths, as would be the case in a mesh or resilient network, there is no single pair of points that can be identified to perform key negotiation and no single PEP that can be selected as the ultimate destination in the tunnel header.

SUMMARY OF THE INVENTION

A first aspect of the present invention is to provide a method for operating on a data packet to provide an enterprise networking environment over a service provider network, including the steps of:

providing a customer edge (CE) router function, located within the enterprise network, operable for providing the data packet;

a Policy Enforcement Point (PEP) function, operable for:

applying an Ethernet encryption protocol to the data packet; and applying a security association policy to the data packet;

a provider edge router function, located within the service provider network, operable for:

applying an MPLS protocol to the data packet to provide a Virtual Private LAN Network (VPLS) service to the enterprise; and forwarding the data packet according to the MAC learning and aging functions provided by the VPLS service.

Another aspect of the present invention is to provide an apparatus for operating on a data packet to provide an enterprise networking environment over a service provider network, including:

a customer edge (CE) router function, located within the enterprise network, for:

providing the data packet;

a Policy Enforcement Point (PEP) function, for:

applying an Ethernet encryption protocol to the data packet; and applying a security association policy to the data packet;

a provider edge router function, located within the service provider network, for:

applying an MPLS protocol to the data packet to provide a Virtual Private LAN Network (VPLS) service to the enterprise; and forwarding the data packet according to the MAC learning and aging functions provided by the VPLS service.

With the present state of the art, there is no way to enable redundant mesh network designs for enterprise networks when encrypting Ethernet traffic from point-to-point either with IKE or with any other key management mechanism negotiated between two parties.

Point-to-point key negotiation does not allow the design of the MPLS VPN network to be point-to-multipoint, one CE connected to multiple PEPs, or multipoint-to-multipoint, multiple CEs connected to multiple PEPs.

The present invention gives precedence to the encryption of Ethernet PDUs at the edge of the enterprise network for resilient VPLS VPN network designs. All Ethernet traffic from the enterprise network is protected using Ethernet Encapsulation Security Payload between the distributed enterprise sites over the MPLS network provided by the service provider. The enterprise network manages its own Ethernet encrypted site-to-site VPN. The service provider independently manages its MPLS network, providing a VPLS VPN or Layer 2 MPLS VPN to the enterprise. The enterprise Ethernet encrypted network can thus be seen as an overlay to the MPLS service provider network.

The enterprise network can have a redundant MPLS VPN network provided by one or multiple service providers and the enterprise network can be redundant as well. Because the enterprise Ethernet encrypted network can be seen as an overlay network to the MPLS network, both the Ethernet encrypted network and the MPLS network can operate independently. The Ethernet traffic is securely tunneled within encrypted tunnels from the edge to the edge of the enterprise network. The Ethernet encrypted traffic is also tunneled within MPLS tunnels from the edge to the edge of the service provider network.

Network Overlay of Security Policies and Encryption Keys to the Data Plane

By dividing the generation and distribution of security policies and encryption keys into separate components and combining them in new ways across multiple devices, the fundamental connection-oriented approach of point-to-point key negotiation can be changed while maintaining most of its present features and all of its security capabilities. This approach can solve the present point-to-point protocol limitations for security policies and encryption keys to completely secure network traffic over resilient networks and in particular point-to-multipoint and multipoint-to-multipoint networks.

This new three-layer approach to the deployment of Ethernet encryption includes the following functional components:

PEP: The PEP devices still exist in the network to protect traffic, but rather than exchanging keys on a one-to-one basis with other PEPs, they receive their security associations (SAs) externally from a centralized entity (KAP).

Key Authority Point (KAP): According to the security policies, the KAP generates SAs and encryption keys, and then distributes them to the PEP units and peer KAP devices.

Management and Policy Server (MAP): The MAP generates the security policies and distributes them to the KAP servers.

The result is that common keys can be used by multiple PEP devices for data transmission over multiple paths in a resilient network.

Generation and Distribution of Security Policies and Encryption Keys

Implementing this three-layer approach, PEPs are deployed between the remote enterprise VPN sites that need secure tunnels.

Each PEP is associated with an Ethernet LAN. A policy will be defined for each LAN associated with each PEP protecting those Ethernet networks.

The KAP can be configured with the policies from the MAP, and can distribute those policies and SAs to the PEPs. The KAP can generate a single outbound key for each PEP policy and its associated network and distribute it securely to the PEP, as well as its peers. For those remote peer PEPs, that key can become the inbound key. Each PEP network then receives the same key per policy from the KAP. PEPs then encrypt the Ethernet traffic using EESP from network to network. Inbound keys, for encrypting the traffic, and outbound keys, for decrypting the traffic, are the same Additional information about the details of the generation and distribution of security policies and encryption keys are incorporated by the following U.S. Patent Applications, all of which are assigned to CiperOptics, Inc., the assignee of the present application, and all of which are hereby incorporated by reference in their entirety:

U.S. Provisional Patent Application No. 60/756,765 entitled SECURING NETWORK TRAFFIC USING DISTRIBUTED KEY GENERATION AND DISSEMINATION OVER SECURE TUNNELS, filed Jan. 6, 2006, which describes how an IP header of an outgoing packet is copied into an outer header of an IPsec tunnel mode packet;

U.S. Provisional Patent Application No. 60/813,766 entitled SECURING NETWORK TRAFFIC BY DISTRIBUTING POLICIES IN A HIERARCHY OVER SECURE TUNNELS, filed Jun. 14, 2006, which describes how to distribute security policies using tunnels; and U.S. patent application Ser. No. 11/526,840 entitled SECURITY ENCAPSULATION OF ETHERNET FRAMES, filed Sep. 25, 2006, which describes how to encrypt Ethernet frames.

Data Protection Implementation over the VPLS Network

The Ethernet data protection network is an overlay to the MPLS Layer 2 VPN redundant network, so no change is required to the service provider MPLS network. Enterprise traffic from CE to CE is protected. The original Ethernet header is in the clear and only the end-user data payload is encrypted using Ethernet encryption. This enables the enterprise customer to leverage the service provider service level agreements (SLAs) and network operations management capabilities.

The MAP provides polices for each network to communicate through the MPLS network and protect traffic between CE sites. The KAP provides a single key for each PEP of the MPLS VPN and distributes it securely to all PEPs. That key will be used both for encrypting inbound traffic and decrypting outbound traffic between the PEPs. No clear policy will be needed in that case since the traffic path between the sites over the VPLS network is determined by the CE routers at Layer 3. Additionally, the KAP can be redundant to insure resilient key generation and distribution.

Thus, the present invention provides for encryption of Ethernet/IEEE 802.3 packet data units (PDUs) at the edge of the enterprise network, in such a way as to support resilient Virtual Private LAN Services (VPLS) network designs.

These and other aspects of the present invention will become apparent to those skilled in the art after a reading of the following description of the preferred embodiment when considered with the drawings, as they support the claimed invention.

BRIEF DESCRIPTION OF THE DRAWINGS

The foregoing will be apparent from the following descriptions of the invention, as illustrated in the accompanying drawings. The drawings are not necessarily to scale, instead emphasis is placed upon illustrating embodiments of the present invention.

DETAILED DESCRIPTION

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

The present invention provides systems and methods for operating on a data packet to provide an enterprise networking environment over a service provider network, including:

a customer edge (CE) router function, located within the enterprise network, operable for providing the data packet;

a Policy Enforcement Point (PEP) function, operable for:
applying an Ethernet encryption protocol to the data packet; and
applying a security association policy to the data packet;
a provider edge router function, located within the service provider network, operable for: applying an MPLS protocol to the data packet to provide a Virtual Private LAN Network (VPLS) service to the enterprise; and forwarding the data packet according to the MAC learning and aging functions provided by the VPLS service.

Figure 1:
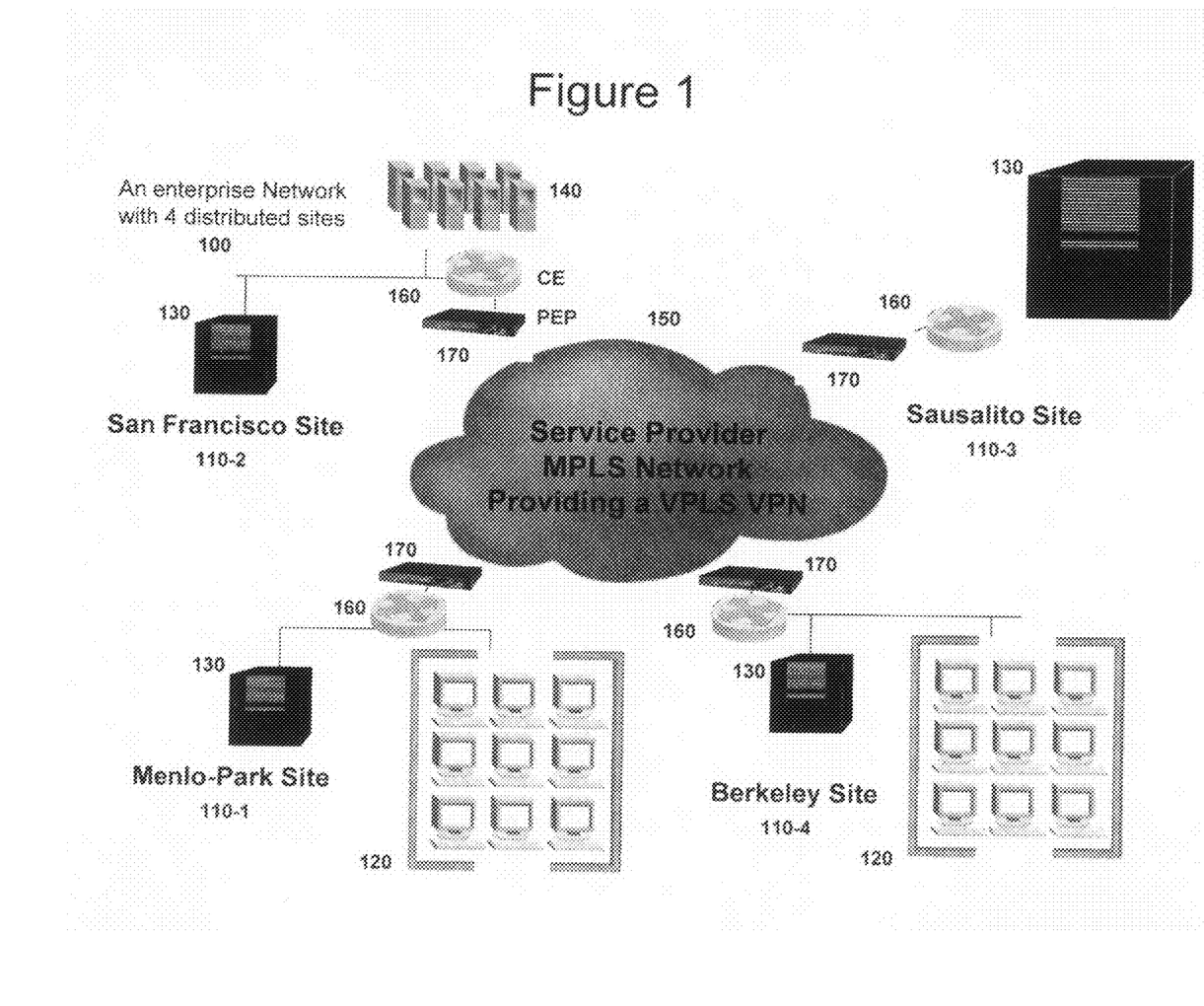
FIG. 1 illustrates a use case of an enterprise network with four remote sites connected over an MPLS network provided by one or multiple service providers and providing a VPLS service to the enterprise.

Referring now to the drawings in general, the illustrations are for the purpose of describing a preferred embodiment of the invention and are not intended to limit the invention thereto. As best seen in FIG. 1, a typical use case of an enterprise network 100 is illustrated. That enterprise network 100 has four remote sites located in four different cities over the San Francisco metro area: Menlo Park, Calif. 110-1, San Francisco, Calif. 110-2, Sausalito, Calif. 110-3 and Berkeley, Calif. 110-4.

Each site 110 might include a number of users 120, datacenters 130 and/or storage area networks 140. Sites can be considered as fairly large considering their number of subnets and as hubs to smaller branch offices that are not represented in this figure.

Each site 110 is called a VPN site and runs an IP network over an Ethernet network. Each VPN site is connected to one or more service provider MPLS networks 150, providing a VPLS VPN. The VPLS implements an encapsulation of the Ethernet service provided over the MPLS network as defined in RFC 4448 and uses either LDP or BGP to provide the distribution of the MPLS labels that emulates the Ethernet bridge as defined in the Internet drafts and RFCs in the Layer 2 VPN working group of the IETF (L2VPN).

Each site 110 wants to protect its Ethernet over the service provider networks 150 using a Layer 2 Ethernet encryption mechanism. To that end, each site edge router called a CE is connected to a PEP 170 that provides Ethernet encryption and decryption of Ethernet PDUs. That PEP 170 can be external to the CE 160 or integrated to it as a blade.

The Ethernet traffic for the enterprise is of high value to its business and therefore must be encrypted. But besides encryption, in order to provide that traffic reliably between each site, the enterprise also needs to provide a resilient network.

Figure 2:
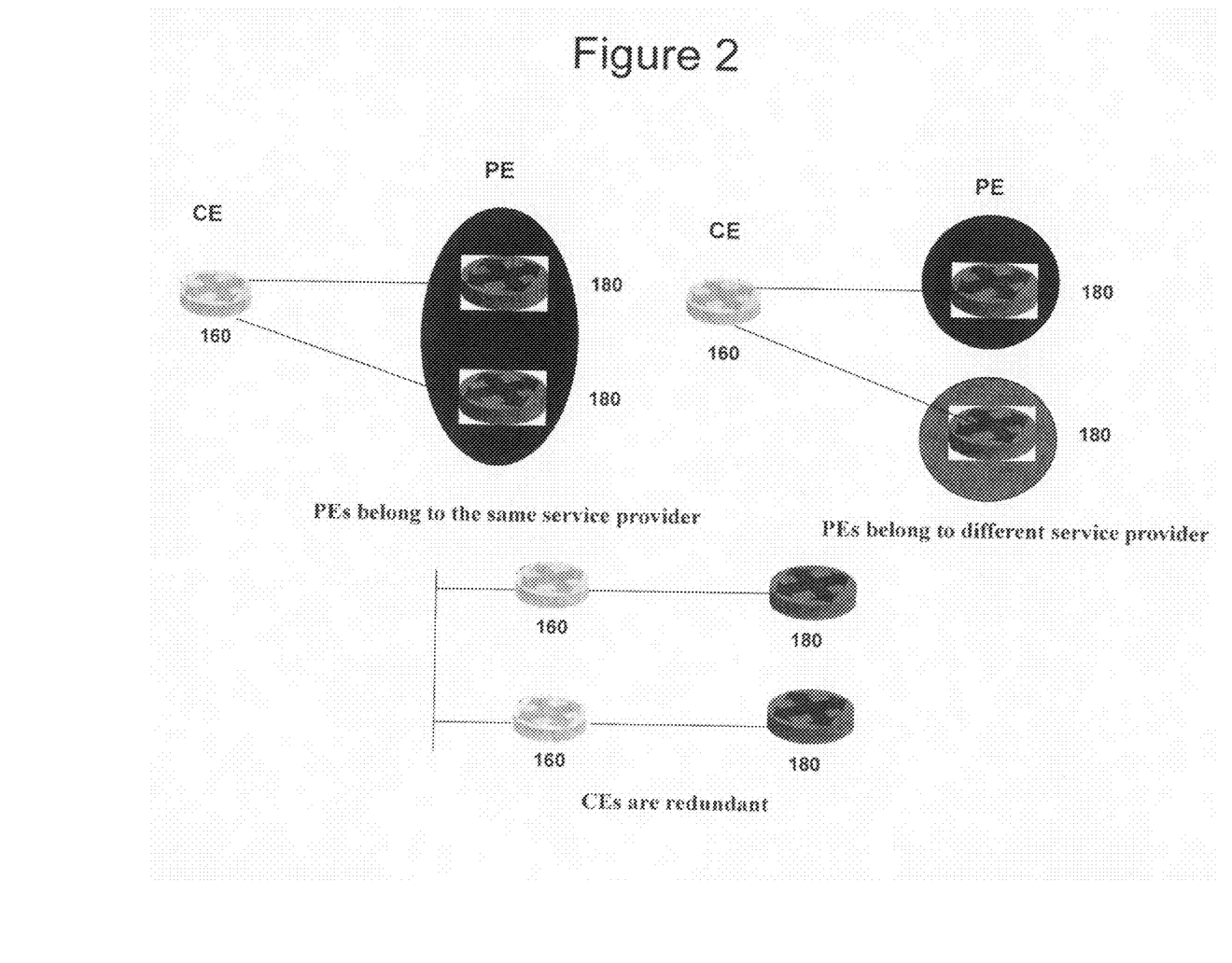
FIG. 2 describes the various network resiliency scenarios possible between CEs and PEs for an enterprise network and its service providers.

Three case scenarios are possible for a resilient network, as represented in FIG. 2; the CE at each site 110 can be redundant; the service provider edge routers called PEs inside the MPLS network 150 can be redundant; or, the PE can belong to one or more service providers.

The minimum resiliency scenario is two PEs 180. The maximum resiliency scenario involves multiple CEs 160 and multiple PEs 180 belonging to multiple service providers.

Figure 3:
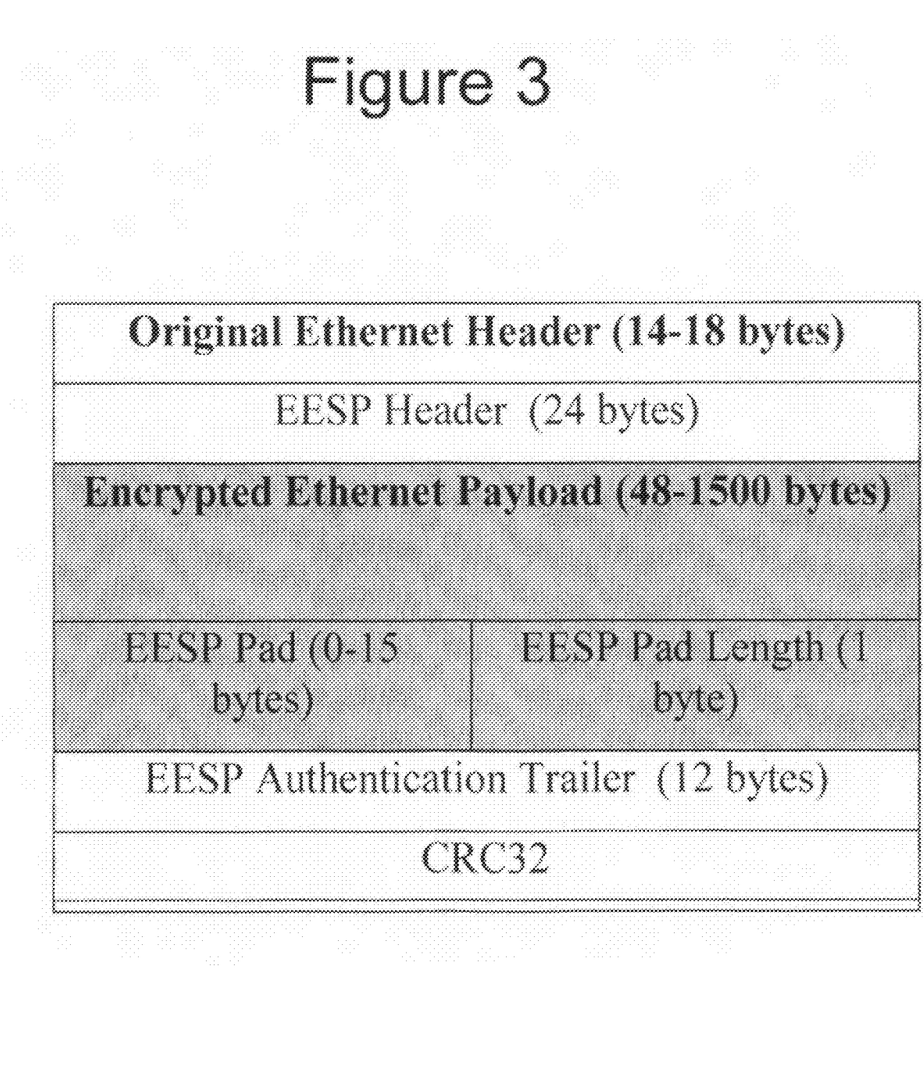
FIG. 3 describes the proposed Ethernet encryption approach using AES-256 for encryption and SHA-1 for authentication.

FIG. 3 illustrates the encryption of the Ethernet packet. Encryption is performed using the Advanced Encryption Standard (AES)-256 Cipher Block Chaining (CBC) algorithm while authentication is provided using the Secure Hash Algorithm (SHA)-1 algorithm.

The encapsulation mode uses the original Ethernet header as the header for the encapsulated packet. The shaded area in the figure identifies the portion of the packet that is encrypted. Encryption keys can be negotiated using IKE, or entered manually.

IKE or any other point-to-point key negotiation protocol can only operate between two endpoints. In other words, IKE is a connection-oriented protocol between two endpoints.

IKE phase I provides authentication and a secure channel between the two endpoints and IKE phase II negotiates the SAs between the two endpoints.

Figure 4:
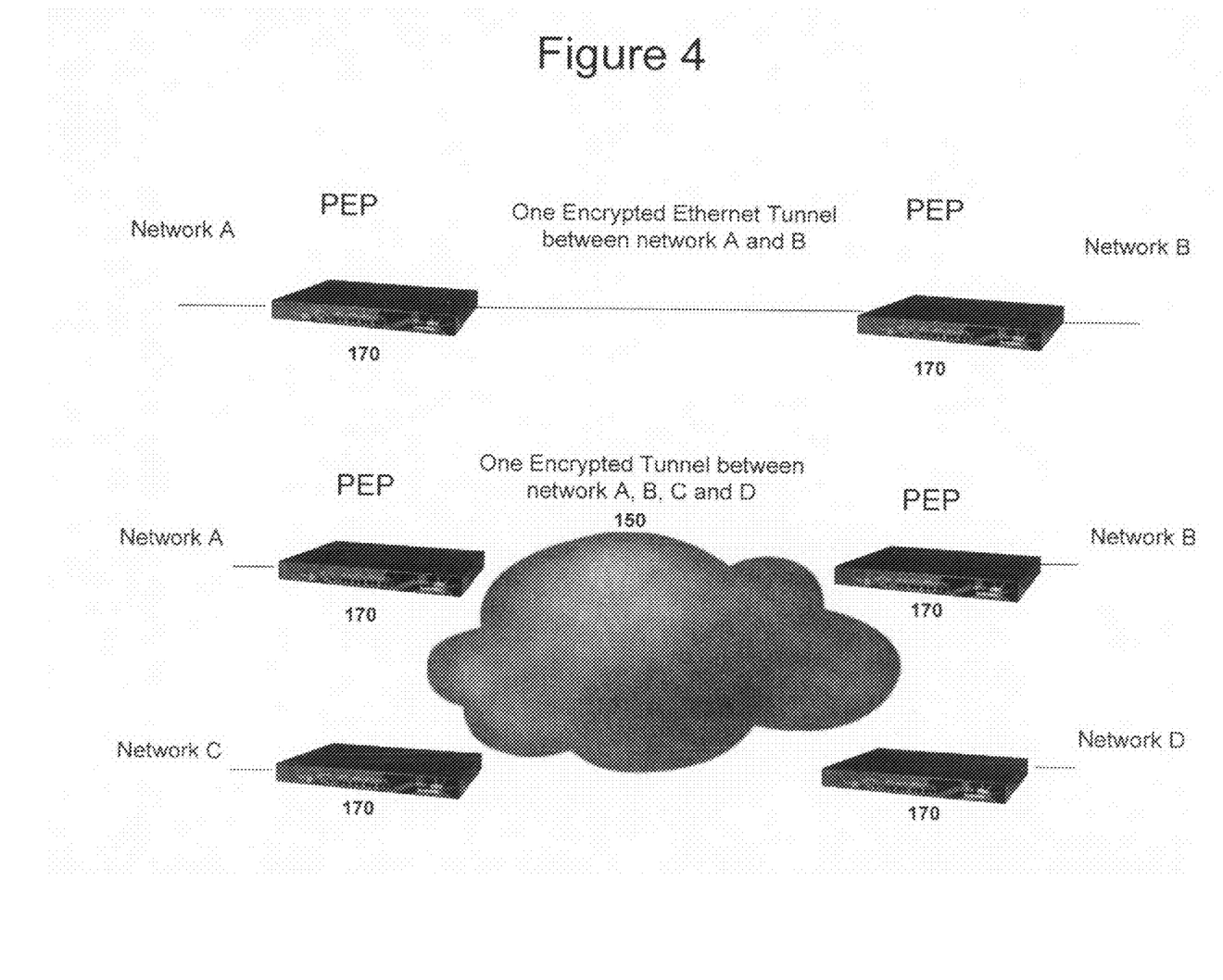
FIG. 4 describes the set-up of the Ethernet encrypted tunnels and SAs for two networks, network A and network B, between two PEPs and when those PEPs are redundant, network C being redundant to network A and network D being redundant to network B.

Encrypting Ethernet PDUs with any point-to-point key negotiation protocol for key generation does not allow the network design to be redundant. In other words, IKE cannot be used between four PEPs at the same time, if the traffic is redundant between each pair of PEPs, as illustrated in FIG. 4. IKE can certainly be used between network A and network B in FIG. 4. But IKE cannot be used at the same time between (network A, network C) and (network B, network D).

One way to encrypt traffic between two redundant networks (network A, network C) and (network B, network D), as in FIG. 4, would be to establish the same SAs for each pair of PEPs 170. The same security policies and encryption keys would be used between each pair of PEPs 170.

Figure 5:
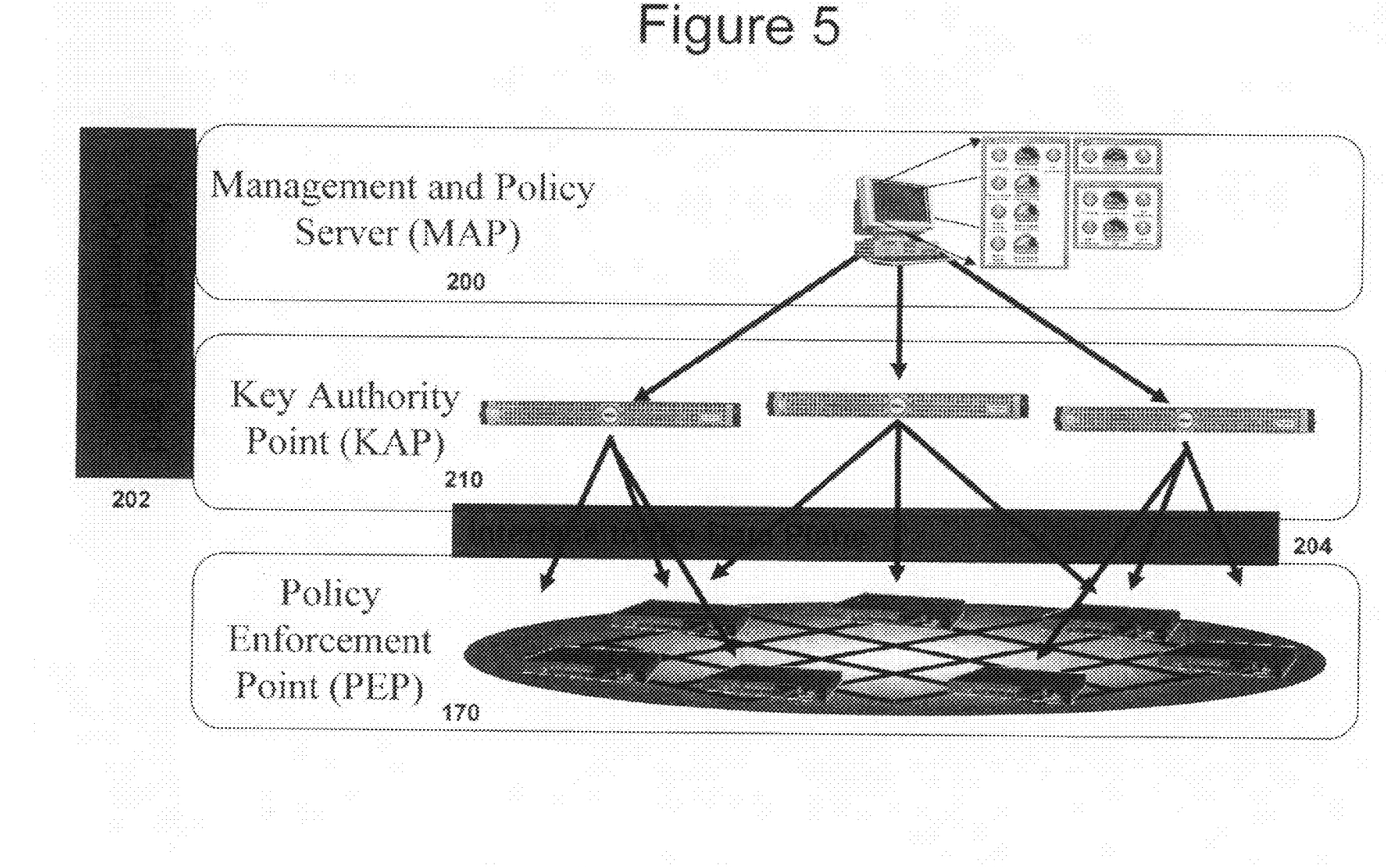
FIG. 5 describes the network overlay of the management and control plane to the data plane for the generation of the security policies and encryption keys.

This can lead to the solution provided in FIG. 5, where security policies and encryption keys overlay the data plane for the encryption. In other words, the management and control plane 202 does not coexist with the data plane 204. One layer provides the security policies that can be viewed as the management plane and another layer provides the encryption keys that can be viewed as the control plane. Encryption keys are generated according to the security policies.

In the illustrated architecture, the device providing the security policy is called a Management Authority Point (MAP) 200, whereas the device providing the encryption keys is called a Key Authority Point (KAP) 210.

The MAP 200 interfaces to the KAP 210, which interfaces itself to the PEPs 170.

The KAP 210 can be redundant. All policies and keys shall be securely stored and distributed. Policies for re-key should be enabled, and each node (MAP, KAP and PEP) should be securely authenticated and authorized to accomplish its function.

Figure 6:
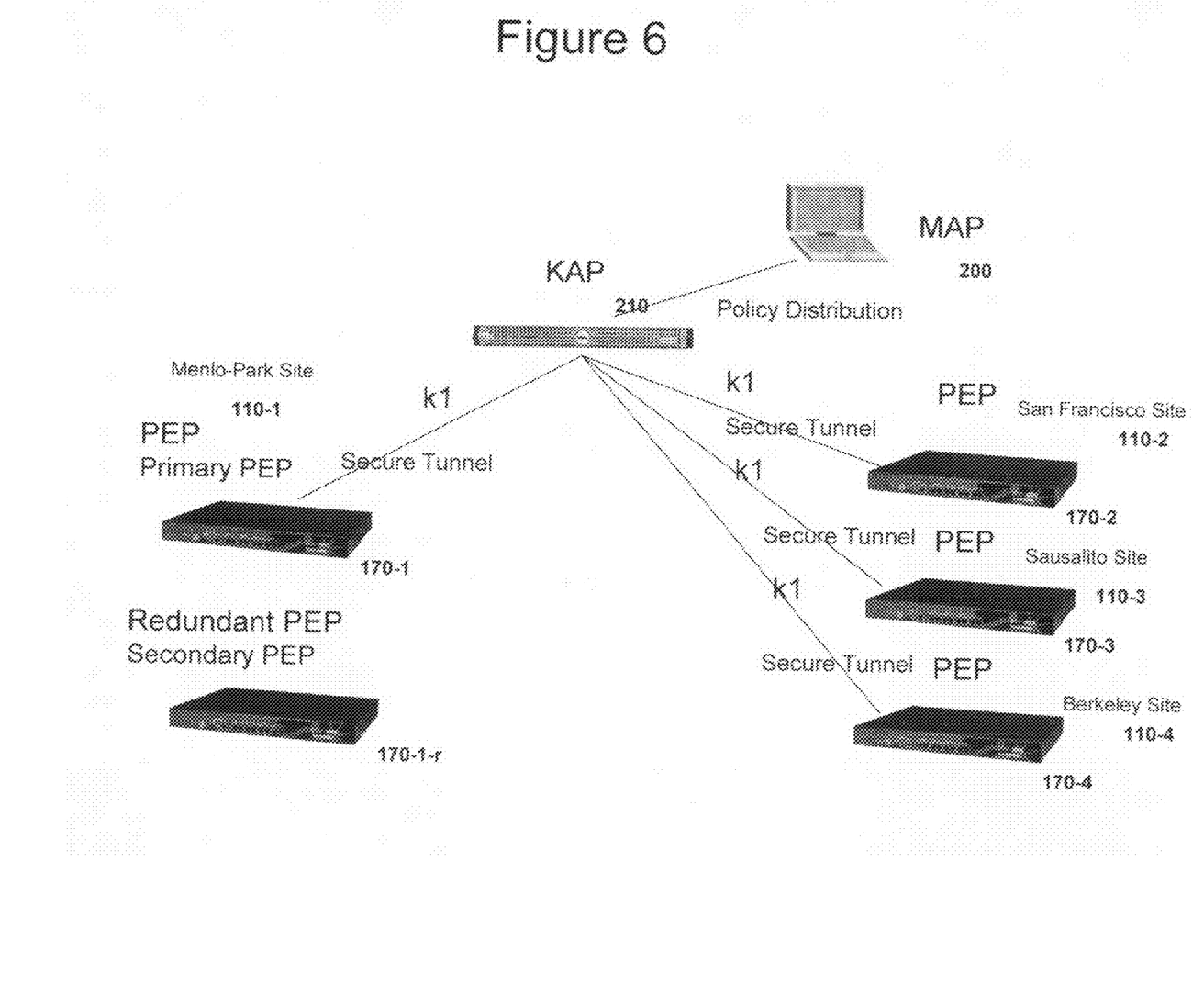
FIG. 6 describes how a KAP with the security policies defined by the MAP generates each key for each PEP of the enterprise site.

Applying the concepts developed in FIG. 5 leads to FIG. 6, which describes a preferred implementation of key exchanges between multiple PEPs 170 that enables the encryption of the Ethernet traffic.

In FIG. 6, the primary PEP 170-1 located at the Menlo Park VPN site 110-1, will receive its outbound encryption key "k1" from the KAP 210. The KAP 210 itself would generate k1. The Menlo Park PEP 170-1 uses that key to encrypt its traffic. That key is also used by the PEPs (170-2, 170-3, 170-4) located at other sites 110 as inbound keys for traffic coming from the Menlo Park PEP 170-1. The KAP 210 thus also distributes k1 to the PEPs (170-2, 170-3, 170-4) located at the San Francisco, Sausalito and Berkeley sites (110-2, 110-3, 110-4, respectively).

When a redundant or secondary PEP 170-1-r is used at the Menlo Park site 110-1, the same security policy and encryption keys will apply both to the primary PEP 170-1 and secondary PEP 170-1-r.

The encryption key k1 is used by all PEPs as both an inbound, to encrypt the Ethernet traffic, and outbound key to decrypt the Ethernet traffic.

Figure 7:
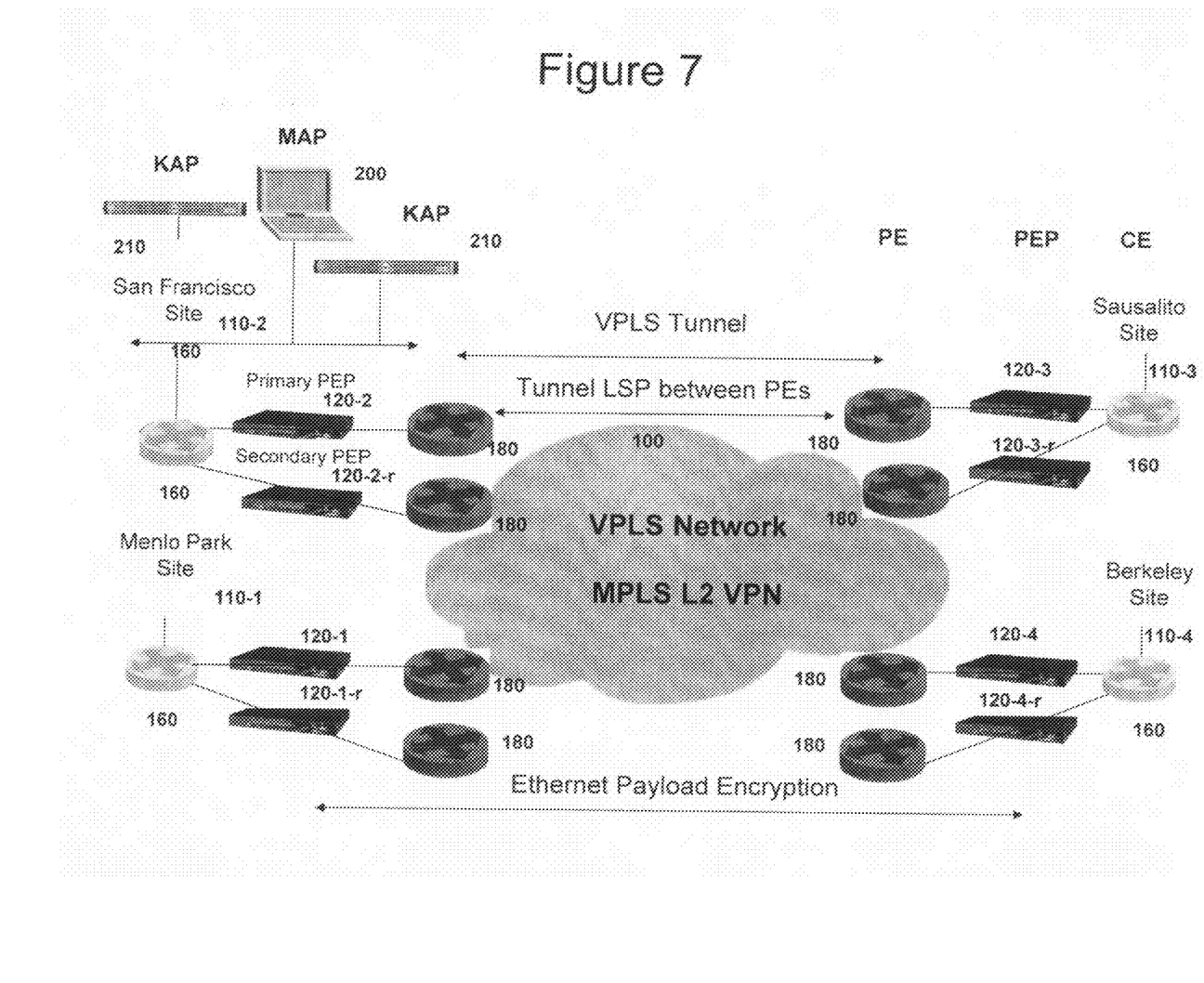
FIG. 7 details the network design of the remote enterprise sites with their associated PEPs connected to the service provider MPLS network.

Applying the concepts of FIG. 6, with the resiliency scenarios defined in FIG. 2 to the use case illustrated in FIG. 1, gives an overall solution as illustrated in FIG. 7.

For example, the MAP 200 and KAP 210 are located in the San Francisco site 110-2 and provide policy and key generation and distribution for the four sites. Each site (110-1, 110-2, 110-3, 110-4) has a redundant PEP (120-1-r, 120-2-r, 120-3-r, 120-4-r). The MAP 200 needs to create only one policy and key, and four mesh Ethernet encryption tunnels.

Encryption of each site's Ethernet VPN traffic at a PEP 120 is tunneled into the VPLS tunnel. In other words, Ethernet tunnels are themselves tunneled within the enterprise network. And, VPLS tunnels are themselves tunneled within the service provider LSP tunnels.

Therefore, Layer 2 frames have the following format:

Tunnel LSP Label (VPLS Label Original Ethernet Header Encrypted Ethernet Payload)

LSP and VPLS labels are in the clear. The VPLS label is the label for the enterprise VPLS VPN. The LSP label is the label for the MPLS service provider network to carry its customers' VPLS VPNs.

The initial Ethernet header is preserved and in the clear. The Ethernet payload is the encryption of the Ethernet frame payload from the CE 160.

This approach enables the enterprise customer to leverage the service provider service level agreements (SLAs) and network operations management capabilities.

Certain modifications and improvements will occur to those skilled in the art upon a reading of the foregoing description. The above mentioned embodiments and examples are provided to serve the purpose of clarifying the aspects of the invention and it will be apparent to one skilled in the art that they do not serve to limit the scope of the invention. All modifications and improvements, including changes in form and details, have been deleted herein for the sake of conciseness and readability but are properly within the scope of the following claims.

What is claimed is:

1. A method for operating on an Ethernet data packet to provide an enterprise networking environment over a service provider network, comprising the steps of:
    encrypting the Ethernet data packet according to an Ethernet encryption protocol to form an encrypted Ethernet data packet;
    applying a security association policy to the encrypted Ethernet data packet;
    applying an MPLS protocol to the encrypted Ethernet data packet to provide a Virtual Private LAN Network (VPLS) service to the enterprise;
    forwarding the encrypted Ethernet data packet according to MAC learning and aging functions provided by the VPLS service;
    wherein encrypting the Ethernet data packet and applying the security association policy are performed by a Policy Enforcement Point (PEP); and
    wherein applying the MPLS protocol and forwarding the encrypted Ethernet data packet are performed by a provider edge router.

2. The method of claim 1, additionally comprising the step of receiving the security association from a network overlay that is responsible for distributing the security policy and the encryption key to the PEPs.

3. The method of claim 2 wherein the network overlay additionally comprises:
    a security policy layer; and
    an encryption key layer.

4. The method of claim 3 wherein the security policy layer is provided by a Management and Policy (MAP) server and the encryption key layer is provided by a Key Authority Point (KAP) server.

5. The method of claim 4 wherein one outbound encryption key is provided for each PEP site that becomes the inbound encryption key for the other PEP sites.

6. The method of claim 4 further comprising the following steps:
    generating one key; and
    distributing the same key both for inbound traffic and outbound traffic for each associated PEP.

7. The method of claim 1, further comprising the steps of:
maintaining the original MAC address header in the Ethernet data packet in the clear; and
encrypting the Ethernet payload of the Ethernet data packet.

8. The method of claim 1, further comprising the steps of:
providing resiliency, by connecting two or more CEs to two or more PEs.

9. The method of claim 8 wherein two PEs are controlled by different service providers.

10. The method of claim 8 wherein the method provides for full mesh connectivity between n sites, where n is greater than 2, enterprise sites is provided by only 2 security associations.

11. A system for operating on an Ethernet data packet to provide an enterprise networking environment over a service provider network, the system comprising:
a customer edge (CE) router, located within the enterprise network, configured to provide the Ethernet data packet;
a Policy Enforcement Point (PEP) communicatively coupled to the CE router, the PEP configured to:
encrypt the Ethernet data packet according to an Ethernet encryption protocol to form an encrypted Ethernet data packet; and
apply a security association policy to the encrypted Ethernet data packet;
a provider edge router communicatively coupled to the PEP and located within the service provider network, the provider edge router configured to:
apply an MPLS protocol to the encrypted Ethernet data packet having a security association policy to provide a Virtual Private LAN Network (VPLS) service to the enterprise; and
forward the data packet according to MAC learning and aging functions provided by the VPLS service.

12. The system of claim 11 wherein the PEP is further configured to receive the security association from a network overlay that is responsible for distributing the security policy and the encryption key to the PEPs.

13. The system of claim 12 wherein the network overlay further comprises:
a security policy layer; and
an encryption key layer.

14. The system of claim 13 wherein the security policy layer is provided by a Management and Policy (MAP) server and the encryption key layer is provided by a Key Authority Point (KAP) server.

15. The system of claim 14 wherein one outbound encryption key is provided for each PEP site that becomes the inbound encryption key for the other PEP sites.

16. The system of claim 14 wherein the KAP is configured to:
generate one key; and
distribute the same key both for inbound traffic and outbound traffic for each associated PEP.

17. The system of claim 11 wherein the PEP is further configured to
maintain the original MAC address header in the Ethernet data packet in the clear; and
encrypt the Ethernet payload of the Ethernet data packet.

18. The system of claim 11, further comprising two or more CEs operable in communication with two or more PEs for providing resiliency.

19. The system of claim 18 wherein two PEs are controlled by different service providers.

20. The system of claim 18 wherein the network includes full mesh connectivity between n sites, where n is greater than 2, enterprise sites is provided by only 2 security associations.

* * * * *